May 17, 1927.
B. F. SAHR
DENTAL IMPRESSION TRAY
Filed July 10, 1926
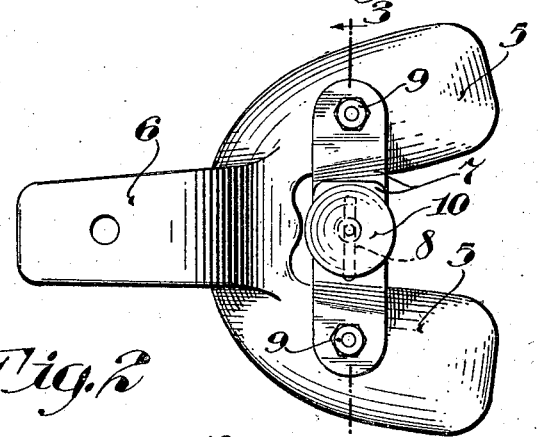
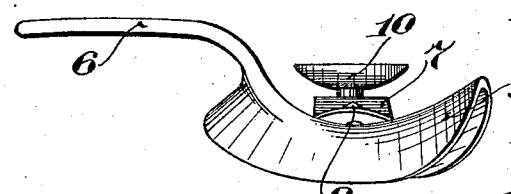
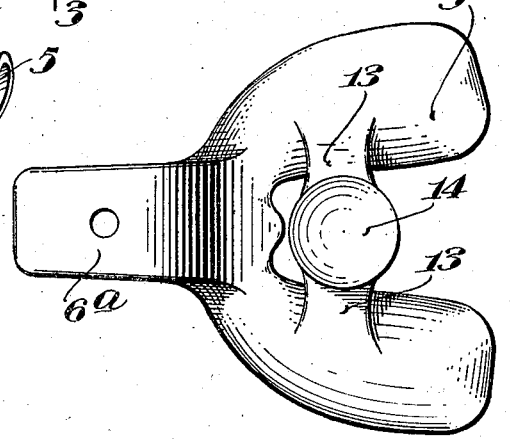
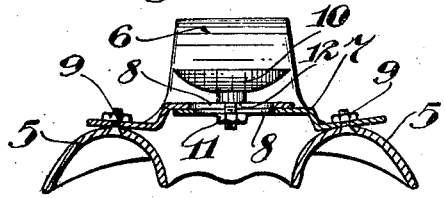
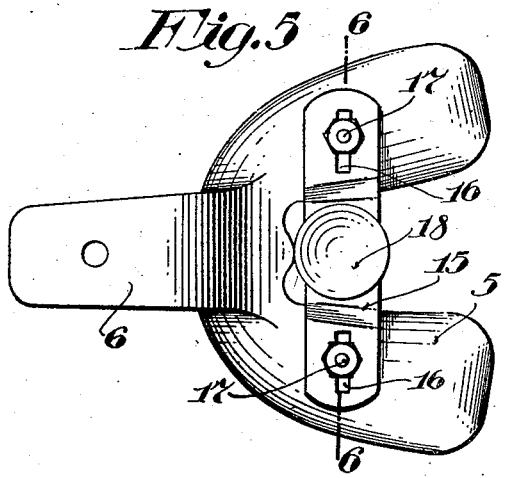
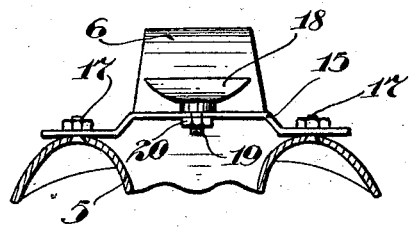
Inventor
Benjamin F. Sahr
By his Attorneys
Michael & Kilgore Patented May 17, 1927.

1,629,177

UNITED STATES PATENT OFFICE.

BENJAMIN F. SAHR, OF HUTCHINSON, MINNESOTA.

DENTAL IMPRESSION TRAY.

Application filed July 10, 1926. Serial No. 121,698.

My invention relates to dental impression trays and, more particularly, to dental impression trays of the type used for lower jaw impressions, and the invention is directed to an improved equalizer for such trays. Generally stated, the invention consists of the novel devices, combinations of devices and arangement of parts hereinafter described and defined in the claims.

In making the mold impression in the plastic material contained in the tray, it is of the utmost importance that the pressure on the two sides be equalized. This equalized pressure has been difficult to obtain in the U-shaped trays used for lower impressions, because there has not been available at a point centrally of the U-shaped tray a pressure device or service adapted to be engaged by a finger or thumb of the hand used to manipulate the tray. My invention provides such a device in connection with the U-shaped trays used for lower jaw impressions.

Dentists are required to have on hand a large number of these U-shaped trays, varying in size and shape for different sizes and forms of mouths. Hence, as an important feature, I provide an adjustable pressure bar adapted to be adjusted and quickly applied to any one of the several different trays.

The invention is illustrated in the accompanying drawings, wherein like characters indicate like parts throughout the several views.

Referring to the drawings:

Fig. 1 is a plan view illustrating an adjustable pressure bar applied to a tray adapted for lower jaw impressions;

Fig. 2 is a side elevation of the parts shown in Fig. 1;

Fig. 3 is a transverse section on the line 3—3 of Fig. 1;

Fig. 4 is a plan view corresponding to Fig. 1 but illustrating a modified form in which the pressure bar is formed integral with the tray;

Fig. 5 is a view corresponding to Fig. 1 and illustrating a modified form of the device; and Fig. 6 is a section taken on the line 6—6 of Fig. 5, some parts being in full.

Describing first the construction illustrated in Figs. 1, 2 and 3, the numeral 5 indicates a tray adapted for lower jaw impressions and provided with the customary handle 6. The pressure bar here illustrated is made up of two substantially flat pressed metal sections 7 having overlapped ends formed with slots 8. The outer ends of the sections 7 are rigidly but detachably secured to the back of the tray by small nut-equipped bolts 9 having heads countersunk into the tray. The numeral 10 indicates a small concave fingerpiece or cup having a threaded stem passed through the coincident slots 8 and equipped with a nut 11, which, when tightened, clamps the overlapped ends of the bar sections 7 together and against a shoulder 12 formed at the bottom of the cup. This fingerpiece will be adjusted so that it will be at the center of the tray and so that when a finger of the hand used to grip the handle 6 is pressed against the same, the pressure put on opposite sides of the tray will be equalized. Obviously, the pressure bar 7 is made longitudinally adjustable so that it will fit onto trays that vary a great deal in width.

This detachable and adjustable pressure bar is especially adapted for application to trays already made. In the manufacture of new trays for lower jaw impressions, the pressure bar may be cast integral with the tray. Such structure is shown in Fig. 4, wherein the pressure bar 13 is cast integral with the tray 5ᵃ and is formed with a concave cup or fingerpiece 14 located at the center of the tray and in line with the tray handle 6ᵃ.

In the construction illustrated in Figs. 5 and 6, the pressure bar 15 is made of a single piece of flat metal raised at its central portion and provided at its ends with slots 16 through which and perforations in the tray 5, nut-equipped bolts 17 are passed to rigidly but detachably secure said bar to said tray. The fingerpiece 18 has a threaded stem 19 passed through a central perforation in the pressure bar 15 and equipped with a nut 20. This bridge bar is not only detachable, but its slots 16 permit it to be applied to trays of different sizes and widths.

The use of this pressure bar as a pressure-equalizing means makes it an easy matter to make the best kind of impressions and greatly improves the technique of dentists using the same.

The efficiency and desirability of the device has been demonstrated in practice.

What I claim is:

1. A dental impression tray for lower jaw impressions having one-piece a U-shaped body and a projecting handle and provided with a rigidly held transverse pressure bar formed with a fingerpiece at the transverse center of the tray for equalizing the pressure on the two sides of the tray.

2. A one-piece U-shaped dental impression tray adapted for lower jaw impressions and provided with a projecting handle, in combination with a longitudinally adjustable pressure bar detachably secured to the back of said tray and provided at the transverse center of the tray with a fingerpiece in line with said handle.

3. The combination with a U-shaped dental impression tray adapted for lower jaw impressions and provided with a handle projecting centrally therefrom, of a longitudinally adjustable pressure bar made up of overlapped sections having slots in their overlapped ends, nut-equipped bolts detachably securing the ends of said bar sections to the back of the tray, and a concave fingerpiece having a stem working through the slots in the overlapped ends of said bar sections and provided with a nut for adjustably clamping said fingerpiece to the overlapped ends of said pressure bar, said fingerpiece being located at the transverse center of said tray.

In testimony whereof I affix my signature.

BENJAMIN F. SAHR.